United States Patent [19]

Park

[11] Patent Number: 5,790,744
[45] Date of Patent: Aug. 4, 1998

[54] TITLE INFORMATION PROCESSING APPARATUS FOR USE IN A VIDEO SIGNAL PROCESSING SYSTEM

[75] Inventor: Hong-ki Park, Suwon, Rep. of Korea

[73] Assignee: Samsung Electronics Co., Ltd., Kyungki-do, Rep. of Korea

[21] Appl. No.: 247,480

[22] Filed: May 23, 1994

Related U.S. Application Data

[63] Continuation of Ser. No. 944,937, Sep. 15, 1992, abandoned.

[30] Foreign Application Priority Data

Sep. 17, 1991 [KR] Rep. of Korea ............ 91-16217

[51] Int. Cl.[6] .................................................. H04N 5/76
[52] U.S. Cl. ............................................ 386/95; 386/46
[58] Field of Search ................................ 358/310, 335, 358/341, 343, 906, 311; 348/392, 563, 468, 705; 386/46, 95, 83, 1, 52, 65, 91; H04N 5/76

[56] References Cited

U.S. PATENT DOCUMENTS

| | | | |
|---|---|---|---|
| 4,729,028 | 3/1988 | Micic et al. | 348/600 |
| 4,757,390 | 7/1988 | Mehrgardt | 358/310 |
| 4,858,012 | 8/1989 | Hino et al. | 358/906 |
| 5,023,721 | 6/1991 | Moon Hwan | 358/183 |
| 5,097,348 | 3/1992 | Suetaka | 358/335 |

FOREIGN PATENT DOCUMENTS

| | | | |
|---|---|---|---|
| 0322909 | 7/1989 | European Pat. Off. | H04N 5/782 |
| 4-2288 | 1/1992 | Japan . | |

OTHER PUBLICATIONS

"An Adaptive Motion Decision System For Digital Image Stabilizer Based On Edge Pattern Matching", by J.K. Paik, Y.C. Park, and D.W. Kim, 1992 IEEE.

Primary Examiner—Thai Tran
Assistant Examiner—Huy Nguyen
Attorney, Agent, or Firm—Sughrue, Mion, Zinn, Macpeak & Seas, PLLC

[57] ABSTRACT

The title information processing apparatus for use in a video signal processing system can record title information on and reproduce it from a recording medium as well as a memory. The title information processing apparatus for use in a video signal processing system capable of mixing title information with a video signal includes a first selector for selecting desired title information between title information supplied from a video signal supply circuit and title information reproduced from a recording medium, a memory for storing the selected title information in the first selector, and a first mixer for selectively supplying a video signal supplied from the video signal supply circuit and the title information supplied from the memory to a video signal recorder. Thus, a variety of titles can be permanently maintained, and the selection of the title information is broadened.

6 Claims, 2 Drawing Sheets

TITLE INFORMATION PROCESSING APPARATUS FOR USE IN A VIDEO SIGNAL PROCESSING SYSTEM

This a Continuation of application Ser. No. 07/944,937 filed Sept. 15, 1992, abandoned.

BACKGROUND OF THE INVENTION

The present invention relates to a title information processing apparatus for use in a video signal processing system, and more particularly to a title information processing apparatus for storing title information into a memory as well as recording the title information on a recording medium, and then for reproducing the recorded title information from the recording medium to again store the reproduced title information into the memory.

Generally, a video signal processing system is composed of a recording apparatus for recording a composite video signal applied through an input terminal on a recording medium, and a reproducing apparatus for displaying the composite video signal applied through the input terminal or picked up from the recording medium on an image display unit. Such a video signal processing system includes a video cassette recorder with which a camera is integrally formed (hereinafter, referred to as a camcorder) or a general video cassette recorder. Here, the input terminal is composed of a photographing apparatus or a tuner circuit, or an external input jack which is connected with the output terminal of an external system for generating a composite video signal. Such a video signal processing system possesses a function in which title information such as user-determined characters, figures, etc., or a desired title picture is processed to be mixed onto a predetermined location of the reproduced main picture screen or in a predetermined frame. That is, the title information consists of titles or icons on the reproduced picture screen, which allows the contents of a reproduced picture screen to be readily understood. Each time they are required, they are read out to be inserted in the predetermined portion of the reproduced main picture screen or into the desired frame of the reproduced pictures.

Referring to FIG. 1, a conventional title information processing apparatus stores a video signal to be processed as title information among video signals supplied from a video signal supply circuit 10, into memory means, for example a digital title information memory circuit 20.

Digital title information memory circuit 20 includes an analog/digital converter for converting an analog signal into a digital signal, a memory, a memory controller for controlling memory operations, and a digital/analog converter for converting the digital signal back into an analog signal, which are not shown in detail in FIG. 1. Accordingly, among the supplied signals from video signal supply circuit 10, the video signal desired as title information is converted into a digital signal in the analog/digital converter and then stored in the memory. Next, when the title information stored in the memory is utilized (that is, when the title information is reproduced from the memory), the digital signal read out from the memory is converted in the digital/analog converter. The analog-converted signal is supplied to a second contact S2 of a first switch SW1. At this time, a read/write control of the memory and an address control for title information to be read from and written into the memory are controlled by a memory controller for controlling the operation of the memory.

A clock generator circuit 30 generates clock signals for matching the phase of the title information reproduced from the memory with that of the video signal supplied from video signal supply circuit 10.

A first switch SW1 selectively outputs either the signal from video signal supply circuit 10 or that from the digital title information memory circuit 20. This selection control is accomplished by a system controller (not shown) for controlling all system functions. The video signal output via first switch SW1 is displayed on a display unit (not shown).

Also, a title picture insertion apparatus is disclosed in Japanese patent laid-open publication No. Hei 1-196981. Therein, as with the above-described conventional technology, a title picture is generated in a viewfinder, and the generated title picture is stored in a memory. Then, the title picture stored in the memory is title-picture-processed and inserted in the input video signal to signal-process the input signal and to record the signal-processed signal on a recording medium. However, such an apparatus is unable to record only the title picture onto the recording medium. Thus, since titles only (without a supplied video signal) cannot be reproduced, the user cannot select between the reproduced title picture and another title picture.

As described above, in the conventional technology, title information is stored only in the memory and cannot be stored in the recording medium. Accordingly, the amount of information stored as title information is limited due to the memory capacity. Also, when new title information is stored in the memory, the existing information is thereby deleted, which is an inconvenience. Also, since the applied memory device is a volatile memory device such as a RAM device, a standby power supply for supplying system power must be separately provided for when the main power supply is turned off.

SUMMARY OF THE INVENTION

Therefore, it is an object of the present invention to provide a title information processing apparatus for storing title information not only in a memory, but also on a recording medium, thereby being capable of permanently storing numerous titles.

It is another object of the present invention to provide a title information processing apparatus for processing, through a memory, title information reproduced from a recording medium on which title information is recorded, thereby selecting title information during screen editing.

To accomplish the above objects of the present invention, there is provided a title information processing apparatus for use in a video signal processing system capable of mixing title information with a video signal, comprising:

selection means for selecting desired title information between title information supplied from a video signal supply circuit and title information reproduced from a recording medium;

memory means for storing the title information selected from the selection means; and mixing means for selectively mixing a video signal supplied from the video signal supply circuit and the title information output from the memory means and supplying the mixed signal to a video signal recorder circuit.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Hereinafter, one embodiment of the present invention will be described in more detail with reference to the attached drawings.

Figure 1:
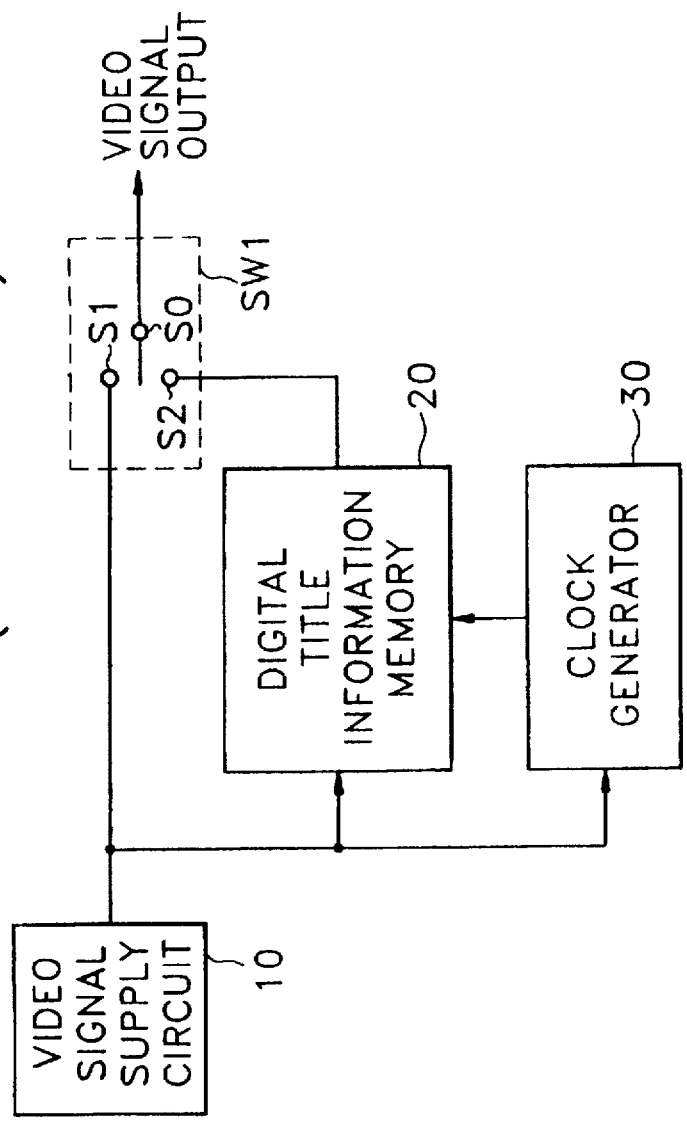
FIG. 1 is a block diagram of the conventional title information processing apparatus.
Figure 2:
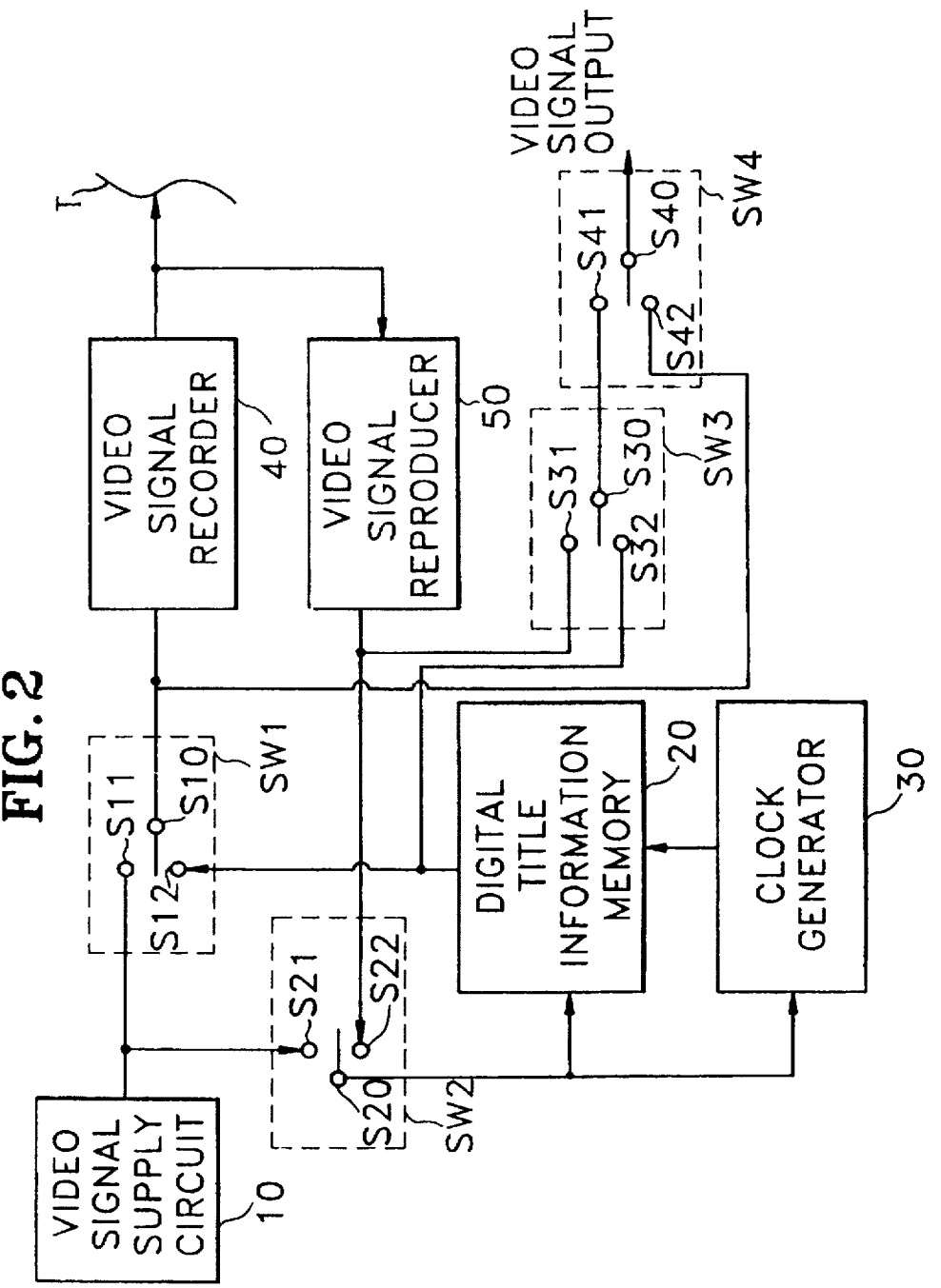
FIG. 2 is a block diagram of one embodiment of a title information processing apparatus according to the present invention.

FIG.2 is a block diagram of one embodiment of a title information processing apparatus, which is an example applied to a camcorder.

Referring to FIG.2, a video signal output from video signal supply circuit 10 is simultaneously supplied to first mixing means, for example, a first contact S11 of a first switch SW1 and first selection means, for example, a first contact S21 of a second switch SW2. A reference contact S10 of first switch SW1 is connected to the input of a video signal recorder circuit 40. A video signal recorder 40 records the processed video signal on a recording medium T such as a tape. A reference contact S20 of second switch SW2 is connected to memory means, for example, to the respective inputs of a digital title information memory 20 and a clock generator 30. The output of clock generator 30 is connected to digital title information memory 20 whose output is connected to a second contact S12 of first switch SW1 as well as a second contact S32 of a third switch SW3. A second contact S22 of second switch SW2 receives the output signal from a video signal reproducer 50 which picks up a video signal from recording medium T. A first contact S31 of third switch SW3 is also connected to the output of video signal reproducer circuit 50. A first contact S41 of a fourth switch SW4 is connected to a reference contact S30 of third switch SW3. A second contact S42 of fourth switch SW4 is also connected to reference contact S10 of first switch SW1. As a result, the reproduced video signal is output through a reference contact S40 of fourth switch SW4.

Now, the operation of FIG. 2 will be described below.

The above-described video signal supply circuit 10 can be composed of a photographing apparatus, a tuner circuit, an external input jack, etc. The, video signal supply circuit 10 represents the photographing apparatus for picking up an image and converting the picked-up image into an electrical video signal.

Video signal recorder 40 and video signal reproducer 50 are conventional circuits, which process the video signals to record and reproduce information using a recording medium (T).

Memory means, for example, digital title information memory 20 is composed of an analog/digital converter, a memory, a memory controller and a digital/analog converter, thereby writing/reading the user-selected title information to and from the memory.

Clock generator 30 receives a synchronizing signal of title information applied to digital title information memory circuit 20, and then supplies a clock signal which matches the phase of the applied synchronizing signal to the memory controller in digital title information memory circuit 20. Accordingly, the memory controller is synchronized with the clock signal, so as to control the read/write operation of the memory.

First switch SW1 selectively passes one of the signals supplied from video signal supply circuit 10 and digital title information memory circuit 20, so as to supply the selected signal to video signal recorder circuit 40. At this time, when title information is not generated, first contact S11 of first switch SW1 is selected. When the user wishes to mix the title information with the video signal output from video signal supply circuit 10, first contact S11 and second contact S12 of first switch SW1 are selectively controlled to perform a switching operation corresponding to an area of the picture screen where the title information is desired to be inserted. When the user wishes to record only the title information, first switch SW1 is controlled to select second contact S12 without interruption.

A second switch SW2 is a switch for selecting title information to be recorded in digital title information memory 20. That is, second switch SW2 selectively passes one of the signals output from video signal supply circuit 10 and video signal reproducer circuit 50.

A third switch SW3 is for mixing the title information and the reproduced signal from tape T. Third switch SW3 mixes the signal output from video signal reproducer 50 and the title information read out from digital title information memory 20 (thereby positioning a title at the desired location of the reproduced picture screen), to supply the mixed signal to first contact S41 of fourth switch SW4. Third switch SW3 operates similar to that of first switch SW1. Thus, if title information is not generated, first contact S31 of third switch SW3 is selected, thereby supplying the video signal output from video signal reproducer 50. When the title information is mixed with the signal output from video signal reproducer 50, first contact S31 and second contact S32 are selectively controlled to perform a switching operation corresponding to the area of the picture screen where the title information is to be inserted. When it is desired that only the title information is to be passed, second contact S32 is selected to pass only the generated title information.

A fourth switch SW4 is for selecting a video signal so as to display the selected video signal on a picture display means (not shown) or to record the selected video signal on another recording medium by means of another video signal recording apparatus. That is, fourth switch SW4 selectively passes either the signal output from first switch SW1 or that from third switch SW3.

Here, first through fourth switches SW1-SW4 are controlled to perform a switching operation by a system controller (not shown) which decodes user-designated commands and the input title information, to output the control signals.

As described above, the present invention can store or record the user's desired title information on a recording medium as well as into a memory, and then reproduces the recorded title information from the recording medium. Accordingly, the present invention can permanently store more titles and select from a wider variety of titles than the conventional title information processing apparatus. Also, since the present invention records the title information on the recording medium, a standby power supply is not required for the digital title information memory circuit, thereby simplifying the apparatus.

What is claimed is:

1. A title information processing apparatus for use in a video signal processing system capable of mixing title information with a video signal, comprising:

a first switch for selecting desired title information between title information supplied from a video signal supply circuit and title information reproduced from a recording medium;

memory means for storing the title information selected from said first switch;

first mixing means for selectively mixing a video signal supplied from the video signal supply circuit and the title information output from said memory means and supplying the mixed signal to a video signal recorder;

second mixing means for mixing and generating a previously recorded video signal reproduced from said recording medium with the title information supplied from said memory means; and selection means for selectively outputting either the signal supplied from said second mixing means or the signal supplied from said first mixing means.

2. A title information processing apparatus, comprising:

a video signal supply circuit for outputting a first title information output;

a video signal reproducer for reproducing and outputting a second title information output from a recording medium;

a first switch, connected to receive said first title information output from said video signal supply circuit and said second title information output from said video signal reproducer, for selecting said first title information output or said second title information output as a selected title information output;

a memory for storing the selected title information output from said first switch as title information;

a first mixing device coupled to receive video signals from said video signal supply circuit and said title information from said memory, for selectively mixing the video signals from said video signal supply circuit and said title information from said memory; and a video signal recorder for recording an output from said first mixing device on the recording medium.

3. The title information processing apparatus as claimed in claim 2, wherein said first mixing device outputs said first title information output to said video signal recorder when said video signal supply circuit outputs said first title information output to said first mixing device and wherein said first mixing device selectively mixes video signals from said video signal supply circuit and said title information from said memory when said video signals are output from said video signal supply circuit and said title information is output from said memory.

4. A title information processing apparatus, comprising:

a video signal supply circuit for outputting a first title information output;

a video signal reproducer for reproducing and outputting a second title information output from a recording medium;

a first switch, connected to receive said first title information output from said video signal supply circuit and said second title information output from said video signal reproducer, for selecting said first title information output or said second title information output as a selected title information output;

a memory for storing the selected title information output from said first switch as title information;

a first mixing device coupled to receive video signals from said video signal supply circuit and said title information from said memory, for selectively mixing the video signals from said video signal supply circuit and said title information from said memory;

a second mixing device, for selectively mixing recorded video signals output from said video signal reproducer and said title information from said memory; and a selection device for selectively outputting either a first output from said first mixing device or a second output from said second mixing device.

5. The title information processing apparatus as claimed in claim 4, further comprising a clock generator for generating a clock signal to said memory in response to said selected title information output of said first switch.

6. The title information processing apparatus as claimed in claim 4, wherein said selection device is a switch, and wherein each of said first and second mixing devices is a switch.

* * * * *